United States Patent
Ng et al.

[19]

[11] Patent Number: 6,061,078

[45] Date of Patent: May 9, 2000

[54] NON-IMPACT PRINTER APPARATUS AND METHOD OF PRINTING WITH IMPROVED CONTROL OF EMITTER PULSEWIDTH MODULATION DURATION

[75] Inventors: Yee S. Ng, Fairport; Hieu T. Pham, Webster; Michael M. Mattern, Hamlin, all of N.Y.

[73] Assignee: Eastman Kodak Company, Rochester, N.Y.

[21] Appl. No.: 08/996,782

[22] Filed: Dec. 23, 1997

[51] Int. Cl.[7] .................................................. H04N 1/21
[52] U.S. Cl. ........................................... 347/237; 347/247
[58] Field of Search .................................... 347/237, 236, 347/247, 246

[56] References Cited

U.S. PATENT DOCUMENTS

| | | | |
|---|---|---|---|
| 4,746,941 | 5/1988 | Pham et al. | 347/237 |
| 4,750,010 | 6/1988 | Ayers et al. | 347/240 |
| 5,025,322 | 6/1991 | Ng | 347/237 |
| 5,126,759 | 6/1992 | Small et al. | 347/237 |
| 5,138,337 | 8/1992 | Ng | 347/237 |
| 5,300,960 | 4/1994 | Pham et al. | 347/130 |
| 5,317,344 | 5/1994 | Beaman et al. | 347/237 |
| 5,586,055 | 12/1996 | Ng et al. | 347/237 |
| 5,666,150 | 9/1997 | Ajewole | 347/237 |
| 5,818,501 | 10/1998 | Ng et al. | 347/237 |
| 5,859,657 | 1/1999 | Donahue et al. . | |
| 5,914,744 | 6/1999 | Ng | 347/237 |

OTHER PUBLICATIONS

US Patent application 08/837,064, filed on Apr. 11, 1997 in the name of Yee S. Ng and entitled: Apparatus and Method of Printing with Non–Uniformity Correction of Exposure Parameters to Reduce Low Spatial Frequency Printed Artifacts.

US Patent application 08/581,025, filed on Dec. 28, 1995 in the name of Fleming et al and entitled: LED Printhead and Driver Chip for Use Therewith Having Boundary Scan Test Architecture.

*Primary Examiner*—N. Le
*Assistant Examiner*—Lamson D. Nguyen
*Attorney, Agent, or Firm*—Norman Rushefsky

[57] ABSTRACT

A non-impact printer apparatus and method wherein enabling waveforms for enabling a plurality of recording elements for recording pixels are characterized by pulse durations that can vary by one exposure clock pulse period with some recording elements being enabled after others so that some of the benefits of center pulsewidth modulation (CPWM) are provided without the disadvantages of CPWM of pulsewidths being at least two exposure clock periods apart.

14 Claims, 9 Drawing Sheets

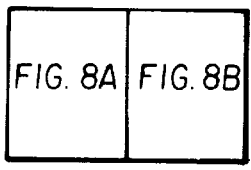
FIG. 8
FIG. 8A
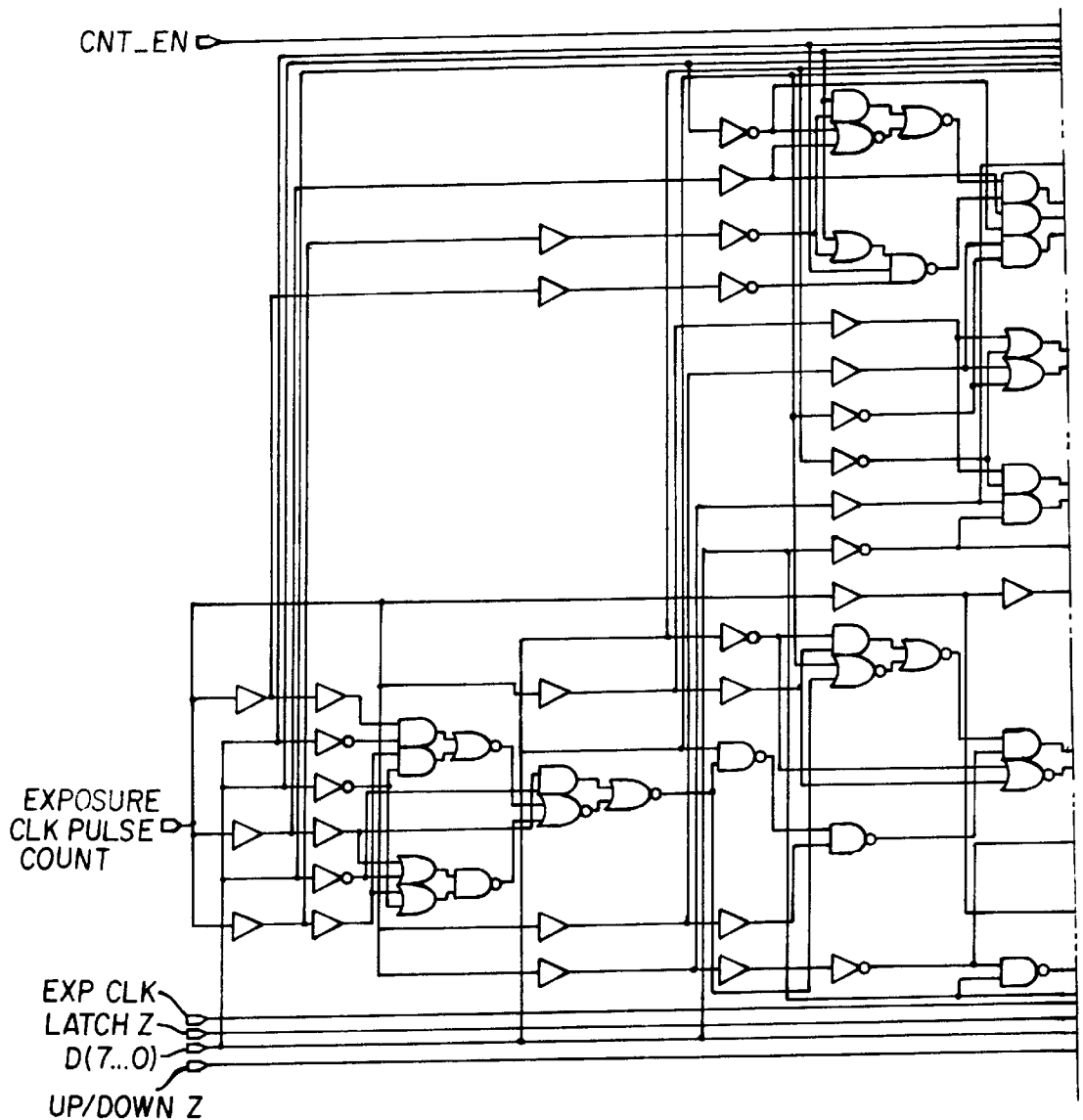

NON-IMPACT PRINTER APPARATUS AND METHOD OF PRINTING WITH IMPROVED CONTROL OF EMITTER PULSEWIDTH MODULATION DURATION

BACKGROUND OF THE INVENTION

Field of the Invention

The invention relates to apparatus and methods for non-impact printing and more particularly to improvements on control of emitter on-time or duration using pulsewidth modulation.

COPYRIGHT NOTIFICATION

A portion of the disclosure of this patent document contains material which is subject to copyright protection. The copyright owners have no objection to the facsimile reproduction by anyone of the patent document or the patent disclosure, as it appears in the Patent and Trademark Office patent file or records but otherwise reserve all copyright rights whatsoever.

DESCRIPTION RELATIVE TO THE PRIOR ART

In U.S. Pat. No. 4,750,010 to Ayers et al, a non-impact printer apparatus and method of printing is described wherein a plurality of independently actuable recording elements arranged in a row may be simultaneously enabled to record a row of pixels as a recording member moves in an in-track (slow scan) direction which is perpendicular to the direction of the row (cross-track or fast scan direction). The printer apparatus as described therein and in this specification may be comprised of various known type of emitters; however, the description will be made with reference to a preferred emitter which is the light-emitting diode.

Light-emitting diode arrays are well known in the art for recording or printing an image on a photosensitive medium such as a film or paper or, alternatively, an electrophotographic receptor. In order to achieve high resolution, and with reference to FIG. 2, a large number of light-emitting diodes are arranged in a linear array 10 and means 7 are included for providing a relative movement between the linear array and the photosensitive medium 12 so as to effect a scanning movement of the linear array over the surface of the photosensitive medium. Thus, the photosensitive medium may be exposed to provide a desired image one line at a time as the photosensitive medium is advanced relative to the LED array either continuously or in a stepping motion by a suitable conventional drive 7. Each LED in the linear array is used to expose a corresponding pixel in the photosensitive medium in accordance with an image defining electronic signal information from a source 8. The information is converted into electrical current by image processing electronics 14.

In the manufacture of such an array, it is conventional to form the array from subarrays, i.e., individual LED chip arrays, of say, 32, 64, 96 or 128 LEDs with many of these subarrays being combined to form the complete linear array. Where an image information signal requires that 1000 or more LEDs be turned on for any one time, the demand for instantaneous current is large as is the generation of interfering electromagnetic radiation (EMI) with its attendant problems. Another problem with such LED arrays is that the respective light output from LED to LED varies even though the same current or more accurately pulse duration is applied to each. In one known approach as exemplified by aforementioned U.S. Pat. No. 4,750,010, the LEDs are analyzed for light output. Those LEDs determined to be relatively weak emitters are provided with a pulse duration "on time" that is relatively longer than the nominal one used for LEDs providing an average light emission. On the other hand, those LEDs determined to be excessive light emitters are provided with a pulse duration "on time" that is less than the nominal "on time." In this approach, for each print line, the strobe or enablement pulses to the LEDs have the starting times staggered to minimize instantaneous current draw. The staggering was such that the set of waveforms (FIG. 1) defining the enabling pulses could be described as having center pulsewidth modulation. A particular circuit described for generating the prior art enablement pulses includes a down-up counter that is responsive to exposure clock pulses. A comparator has as one of its input a multibit image data signal that is related to the duration of enablement for recording a pixel by a particular LED. The down-up counter provides a changing count output that is a second input to the comparator upon a match of the count output by the counter and the image data signal the comparator causes a driver current provided to the LED which effectively commences exposure of the image recording medium. Since the counter output changes with exposure clock pulses, different LEDs will "turn on" in accordance with the respective data signal for recording the different pixels and the "turn on" times will be staggered. After counting down to zero, the counter mode is changed to a count up mode and turn off times for the LEDs will again be staggered in accordance with the data. The different enablement times for three different recording elements that have different corrected input image data signals can be seen in FIG. 1. A problem with this is that the propagation delay of the comparator circuit in the LED driver chip on the printhead or the exposure clock signal on the printhead may have a speed limitation of 50 nanoseconds (ns). Thus, as can be seen in FIG. 1, the differential exposure time between two adjacent corrected exposure levels in the same recording line period is limited to 100 ns. For a higher quality image recording system, this limitation may be undesirable because of the need to record pixels with better control over uniformity.

It is therefore an object of the invention to provide an improved non-impact printer apparatus with improved control of uniformity or pixel size or density while providing at least some of the benefits of staggering of on and/or off time.

SUMMARY OF THE INVENTION

The above and other objects of the invention are realized by a non-impact printer apparatus and method wherein enabling waveforms for enabling a plurality of recording elements for recording pixels are characterized by pulse durations that can vary by one exposure clock pulse period with some recording elements being enabled after others so that some of the benefits of center pulsewidth modulation (CPWM) are provided without the disadvantages of CPWM of pulsewidths being at least two exposure clock periods apart.

BRIEF DESCRIPTION OF THE DRAWINGS

In the detailed description provided below, reference will be made to the accompanying drawings wherein.

DETAILED DESCRIPTION OF THE REFERRED EMBODIMENTS

Because apparatus of the type described herein are well known, the present description will be directed in particular to elements forming part of, or cooperating more directly with, the present invention.

Figure 3:
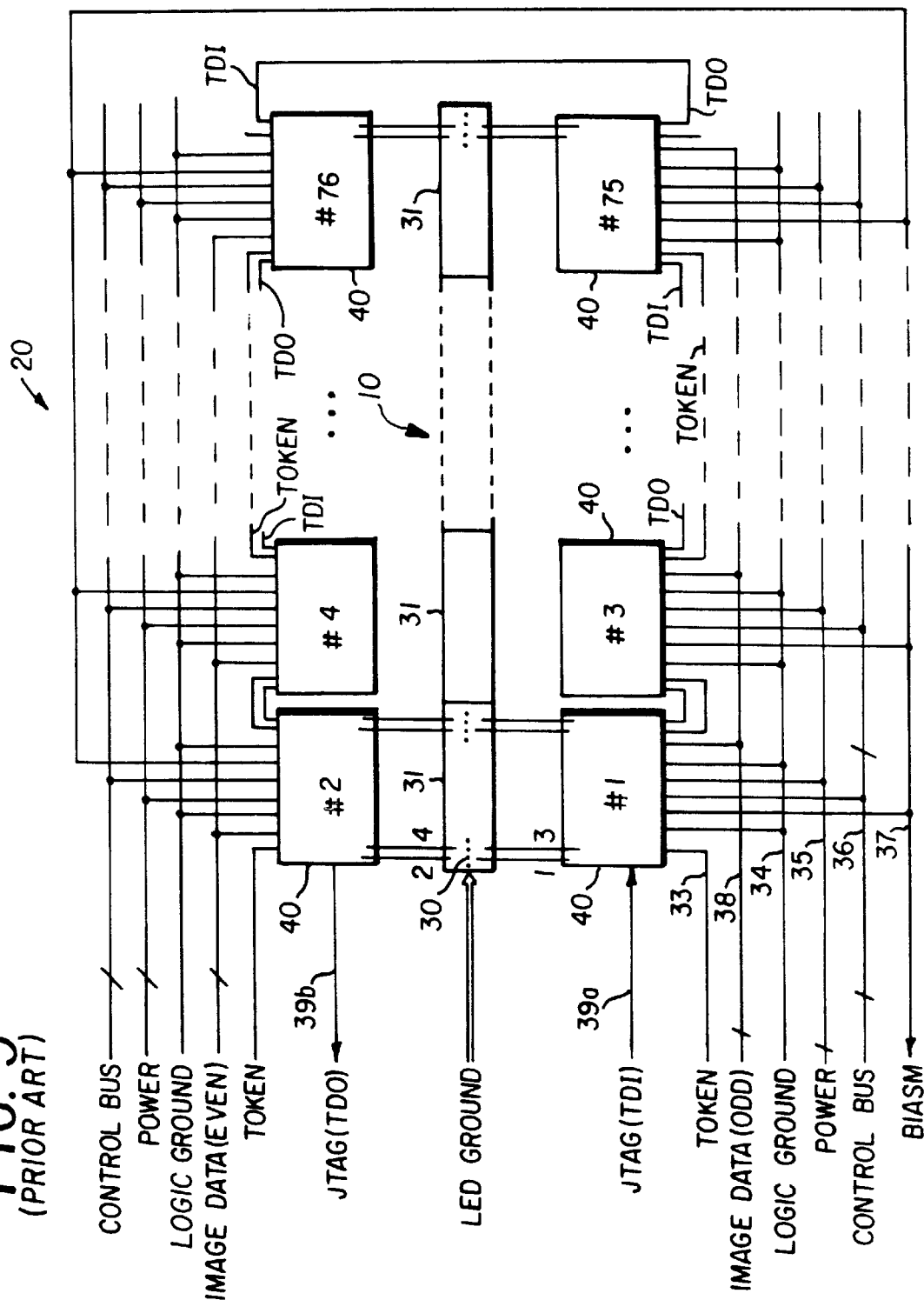
FIG. 3 is a schematic of an LED printhead as known in the prior art and is generally configured in accordance with the preferred embodiment of the printer apparatus of the invention.

With reference to FIG. 3, LED printheads, as known in the art, include a single row of LEDs formed in chip arrays. Each chip array may contain say 192 LEDs at a resolution of say 600 dots per inch (DPI) or 128 LEDs at 400 DPI or 96 LEDs at 300 DPI. As may be seen from FIG. 3, the chip arrays 31 are mounted end to end on a support on the printhead 20 so that a single row of several thousand LEDs 30 is provided. Driver IC chips 40 may be mounted on one or both sides of this row of LEDs and these driver IC chips incorporate the circuitry for handling the data signals to determine which LEDs are to be turned on or be illuminated during a pixel (picture element) recording period and for providing the driving currents to the LEDs turned on. In one typical application as illustrated in FIG. 3, two driver chips 40 incorporate the circuitry for driving the 128 LEDs on a chip array. One of these driver chips is used to drive the 64 odd-numbered LEDs and the other is used to drive the 64 even-numbered LEDs. Parallel signal carrying lines 33–39 are provided to carry signals from a logic control unit and power supply to control operation of the printhead.

The printhead may have the driver chips and LED chip arrays mounted on modules as described in U.S. Pat. No. 5,317,344, the contents of which are incorporated herein by reference. In this patent, an LED printhead has a metal or metal-coated ceramic tile on which is supported a plurality of driver chips (40) and LED chip arrays (31). A pair of spreader boards are provided outboard of the driver chips for distributing signals to various driver chips to which they are connected. The spreader boards on adjacent modules are daisy-chained together by bond pads and wire bonds located adjacent the edges of the tiles. The LED arrays and driver chips may be mounted on the spreader board. The modular construction allows for separate assembly and test of the modules before mounting on the printhead support structure or base. However, the modular construction is only an example and in accordance with the invention the printhead may be assembled without a modular construction.

There also may be associated with the printhead an interface board. The interface board may include a flash memory (electrically erasable PROM), an analog to digital converter (ADC) and a control chip for controlling reading and writing of data to the flash memory and operation of the ADC, a connector and termination network and various other leads and components such as resistors, capacitors and a reference voltage source that are well known for enabling the particular components mounted on the circuit board comprising the interface board. Further description of the operation of an interface board is provided in U.S. application Ser. No. 08/581,025, filed Dec. 28, 1995 entitled "LED PRINTHEAD AND DRIVER CHIP FOR USE THERE-WITH HAVING BOUNDARY SCAN TEST ARCHITECTURE;" the contents of which are incorporated herein by reference.

Figure 4:
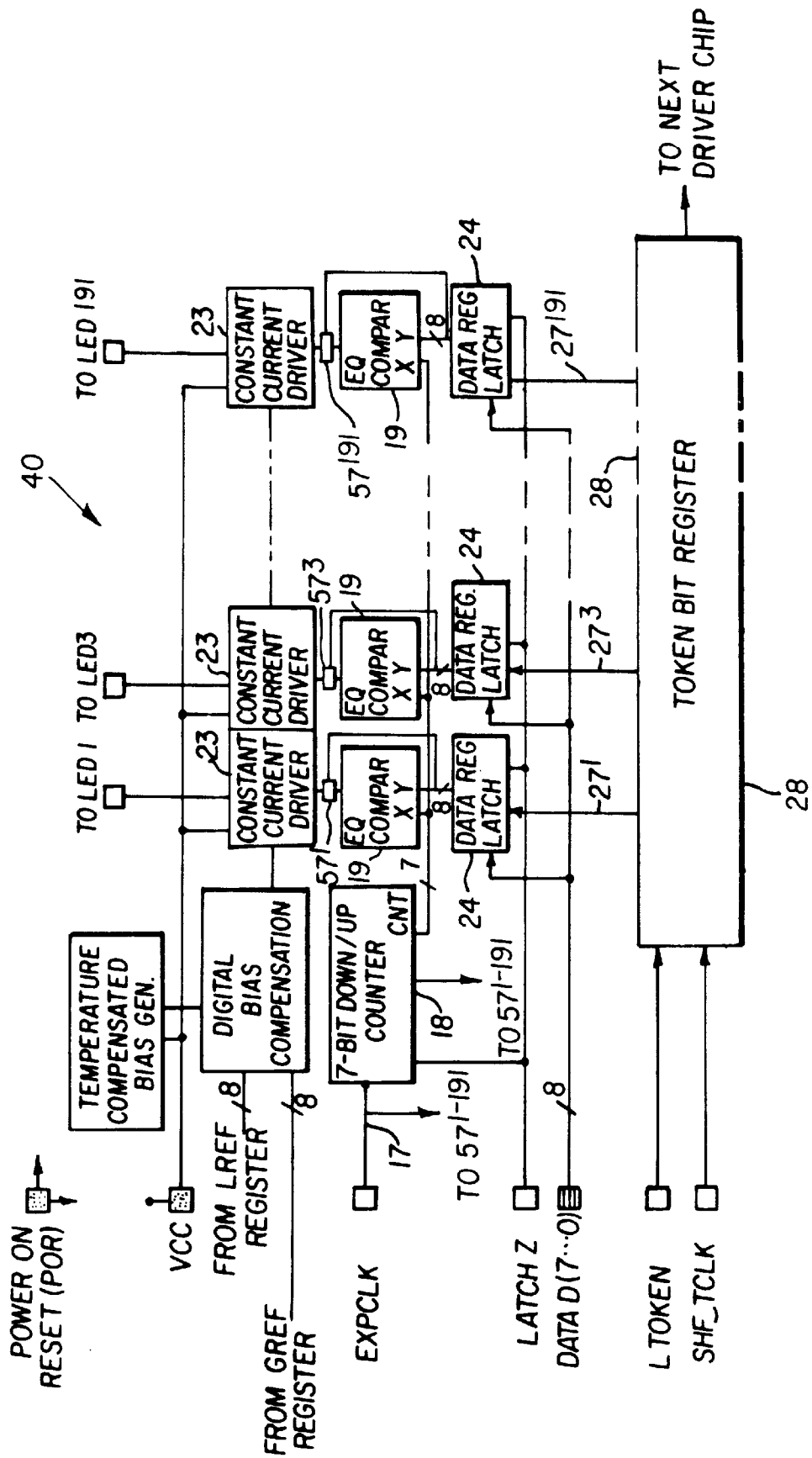
FIG. 4 is a schematic of a circuit associated with a driver chip forming a part of the printhead of FIG. 3 and is in accordance with the printer apparatus of the invention.

With reference now to FIG. 4, there is a shown a schematic of the functional parts of the driver IC chip (40) whose primary function is to generate pulse-width modulated currents in 64 channels for selectively driving 64 corresponding LEDs on an associated LED chip array. Each of these channels includes a data latch register 24 for storing in this example an eight-bit image data value which represents a corrected image data signal of a grey-level data signal that is corrected for nonuniformities in the LEDs across this printhead. The grey-level data signal prior to correction may define a grey level of a pixel using 1, 2, 4, or 6-bits. Reference to U.S. Pat. No. 5,666,150 and U.S. application Ser. No. 08/837,064 filed Apr. 11, 1997 entitled "APPARATUS AND METHOD OF PRINTING WITH NON-UNIFORM CORRECTION OF EXPOSURE PARAMETERS TO REDUCE LOW SPATIAL FREQUENCY PRINTED ARTIFACTS", may be had relative to correction of LEDs or other recording elements for nonuniformities. It will be appreciated however that correction for nonuniformities, while preferred, is not essential to this invention.

A data source such as a computer, word processor, image scanner or other source of digitized image data 8, provides image data signals to a data processor or image processing electronics 14 which may comprise a raster image processor. The data processor under control of clock pulses from a marking engine controller 9 (MEC), provides a plurality of outputs including rasterized data outputs and control signals which are fed to the printhead 20. In addition, the MEC provides exposure clock pulses via line 17 to a down/up counter 18 (FIG. 4) which, when enabled by a signal from the MEC, counts such clock pulses and provides at an output having a plurality of lines a digital signal representation of the state of the counter. Typically, such a counter has one line representing a least significant bit of such count and other lines representing other more significant bits. In accordance with a technique fully described in the aforementioned U.S. Pat. No. 4,750,010 in the names of Ayers et al, the contents of which are incorporated herein by this reference, the output of counter 18 is provided to a first set of input terminals (X) to a comparator 19 (see FIG. 5) associated with each recording element 30, i.e., LED 1 in this embodiment. A plurality of data lines (eight in this embodiment) from a corresponding multibit data latch register 24 is connected as an input to a second set of input terminals (Y) associated with each comparator 19. The comparators 19 each compare the output of the counter 18 with the value of the respective data output from the respective data latch register 24 on the data lines. As will be described herein, the image data signals provided to each comparator relates to a desired ON time or period of enablement for a respective LED 30 for the recording of a particular pixel corresponding to the image data signals. The image data signals provided to each comparator 19 during the printing of a single line of dots by the row of LEDs is related to the desired pixel or dot density to be exposed onto the image receiver medium by that LED for that particular line of dots. Eight independent lines of data D (7 . . . 0) provide an eight bit digital image data signal that allows for grey-scale variation of the output of each LED during each pixel recording cycle of operation. During each cycle the data to each comparator may comprise eight binary bits representing an amount from decimal 0 to decimal 255. The data lines comprise a bus or plurality of data lines that are simultaneously available to all data registers in the driver chips associated with this segment of the printhead as will be described below.

Suppose, for example, that an LED, LED 1, is to be enabled for a time period equal to 5 exposure clock periods. In response to a start pulse on line LATCHZ, the counter 18 is enabled and commences to count exposure clock pulses from line 17 from decimal 127 to 0. Note that the spacing between adjacent clock pulses may be generated to have a variable programmable period. The seven bit output of counter 18 is coupled to one set of inputs at terminal X of each of the comparators 19. This count is now compared with the data input at the other set of inputs at terminal Y of this comparator which represents in binary form decimal 2. As will be described below, the least significant bit input of the data input at terminal Y is not used so that the input at terminal Y is only considered to be a 7-bit binary number. When the initial 8-bit number is decimal 5, the corresponding 7-bit binary number is decimal 2. When there is a "match," i.e., when the count of terminal X is 2, a pulse is provided at the output terminal of comparator 19 that as will be shown below will after a next exposure clock pulse enable the constant current driver 23 to commence and maintain current to LED 1. After the counter counts down to zero, the counter may be inhibited from counting additional clock pulses for a period TMIN that is either programmed into the counter or provided by other suitable means. After this predetermined time period TIN, if used, the counter is set to count in its up mode and commences counting exposure clock pulses again. When the counter in its count up mode reaches decimal 2 current to the LED will cease after an additional two exposure clock pulses. The other LEDs, etc. operate in similar fashion, but their data may require different count values to turn on and off. As will be described below, even decimal data are treated differently. The pulse duration for each LED during each line of print is varied, however, in accordance with their respective image data signals. Reference is also made to U.S. Pat. No. 5,300,960, regarding a clocking scheme using a non-linear clock, the contents of which are incorporated by this reference. As noted in this latter reference, correction for unequal light output from LED to LED may be provided by adjustment of the grey level image data in accordance with the characteristics of each LED. Thus, data for an LED can be corrected or modified to provide an input count at terminal Y that represents data modified by the exposure characteristics of the LED. For example, for an LED that is a relatively stronger light emitter the corrected data would modify grey level data bits for that LED to reduce the count that otherwise would be provided at terminal Y for an LED that is an average light emitter. Techniques and circuits for providing uniformity corrected exposure data are well known and may be found in the following U.S. patents, the contents of which are incorporated herein by reference: U.S. Pat. No. 5,666,150 and U.S. Pat. No. 5,586,055.

Still other circuitry for balancing the driving current to the LEDs is described in the aforementioned U.S. application Ser. No. 08/581,025.

Data Loading

The image data signals are output by the data processor in accordance with image data signals for the odd-numbered LEDs and image data signals for the even-numbered LEDs. In addition, as is well known, data may be further divided into data for high and low-numbered LEDs so that four sets of eight-bit data may be sent to the printhead simultaneously. Still higher divisions are possible. For example, the printhead may be considered to comprise three segments; i.e., low numbered LEDs, medium numbered LEDs and high numbered LEDs with a breakdown for odd and even-numbered LEDs there may be simultaneously provided to the printhead six sets of eight-bit data. Discussion will now be made with regard to the image data signals for the low odd-numbered LEDs, since operation and circuitry for the other LEDs is identical. Data lines D (7 . . . 0) are independent lines each carrying a signal representing a digital bit (0 or 1) so that together their respective signals define a digital eight bit number from decimal 0 to decimal 255 that defines a corrected image signal for recording a pixel by a particular LED. This image data signal is passed along lines D (7 . . . 0) on the printhead 20 which lines comprise an image data signal bus. Associated with each LED is a data latch register means 24 (FIG. 4) for latching data from this bus during each cycle of operation for printing a single line of dots or pixels. A token bit is used to enable a data register means associated with a particular LED to accept the data while other data latch register means associated with other LEDs await their respective data. Description relative to latching of data using a token bit is described in U.S. Pat. No. 4,746,941, the contents of which are incorporated herein by reference and in the aforementioned U.S. application Ser. No. 08/581,025.

The data latch register means 24 for each LED comprises a pair of latches or bi-stable multivibrators for each of the eight data lines. The pair of latches are connected in a master-slave relationship wherein in response to a token bit signal at the enable input terminal of the master latch, an image data signal at the data input terminal of the master latch will cause the output of the master latch to either change or remain the same depending upon the image data signal. It will be noted that the eight master latches in the data register means of each LED are commonly connected to a respective line 27 (three of such lines $27^1$, $27^3$, and $27^{191}$ are illustrated) to simultaneously receive the token bit signal from the token bit shift register 28. A complete description of a token bit shift register is described in the aforementioned U.S. application Ser. No. 08/581,025.

In the example where the token bit is to be shifted from left to right in FIG. 4 for the Data Odd lower numbered quarter of the printhead, a signal is made at an appropriate logic level to allow the token bit on line LTOKEN to pass from left to right. Thus, in response to clock pulses (SHFTCLK) the token bit is passed from stage to stage (left to right in FIG. 4) of the token bit shift register 28 and accordingly outputted sequentially over respective lines 27 for enablement of all the master latches of a respective data latch register 24. With movement of the token bit from stage to stage of the shift register 28 the corrected image data bits occurring on lines D (7 . . . 0) are accepted by the data registers 24 in turn from left to right until all the data registers on this quarter of the printhead have acquired their respective six bits of data. A latch enable signal is then pulsed low on line LATCHZ to cause the respective slave latches in all the data registers 24 to latch the data at their respective outputs. The respective outputs of the slave latches are now communicated to the data input terminals Y of the respective comparators 19 for determining the duration of exposure for each LED in accordance with the techniques described above and to be further described below. The master latches are now free to receive the image data signals for the next line of dots or pixels to be recorded while the current line of pixels are being recorded.

Current Drivers

Reference may be had to U.S. Pat. No. 5,126,759 for a description of one current driving circuit the contents of which are incorporated herein by reference. It will appreciated that other circuits known in the art may be used and that a specific circuit is not critical to this invention. In a typical application, the enable signal created causes transistors to act as switches and form a part of a current mirror driving circuit that includes a master circuit formed by transistors and a series of digitally controlled transistors. More details concerning the digitally controlled transistors may be found below with reference to the aforesaid U.S. application Ser. No. 08/581,025 wherein the use of $L_{REF}$ and $G_{REF}$ registers is provided for control of the amount of driver currents to LEDs using digital bias compensation.

Figure 5:
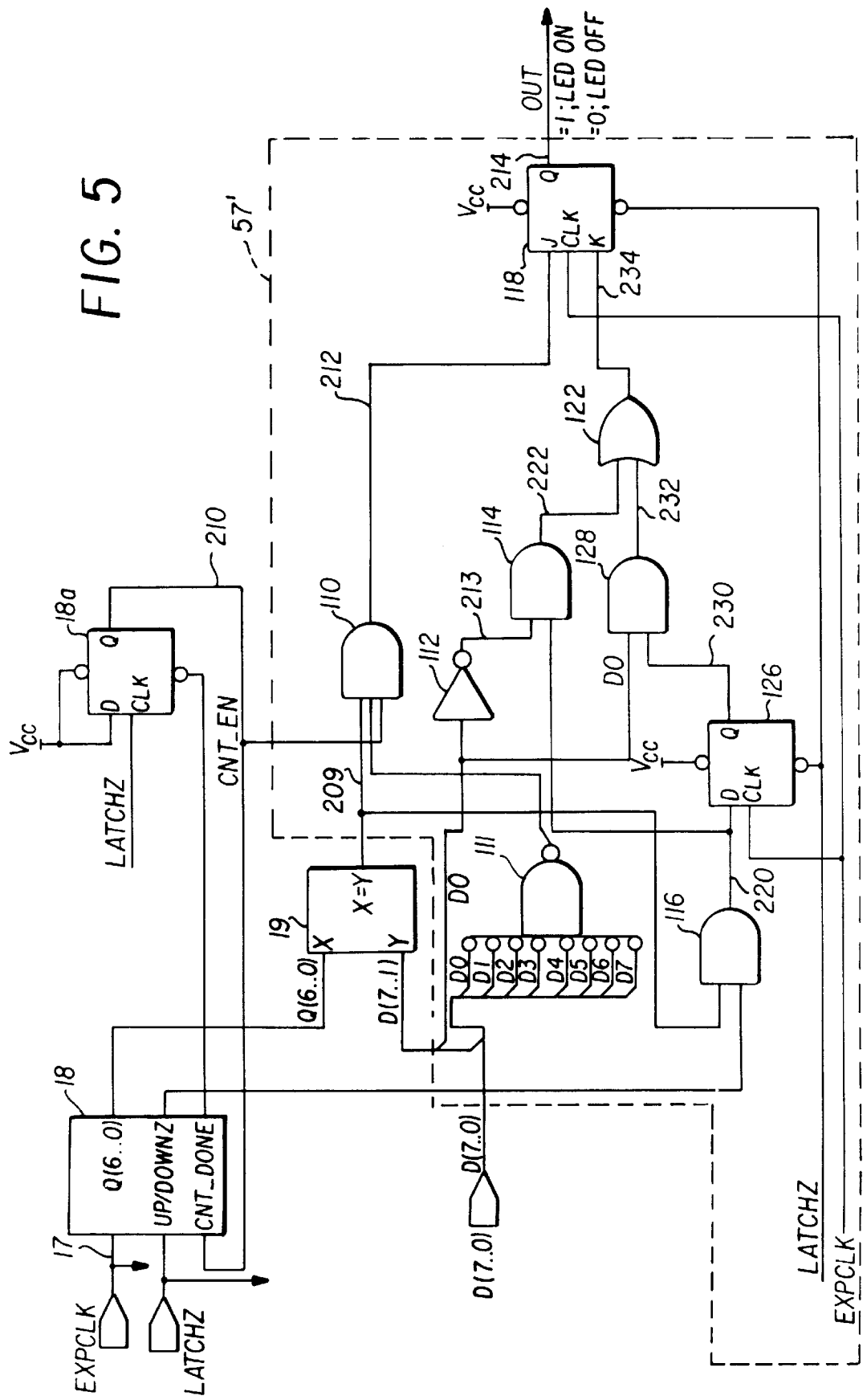
FIG. 5 is a schematic of a circuit forming a part of the printer apparatus of the invention and illustrates in more detail a portion of the circuit of FIG. 4.

With reference to FIG. 5, details of a logic circuit 57 between the comparator 19 and the constant current driver circuit 23 for each LED channel is illustrated. In response to a LATCHZ pulse, data is transferred to the output of the latch register latch 24 and into the input terminal Y of comparator 19. As may be seen in FIG. 5, the least significant bit of the eight bit signal D (7 . . . 0) is not input into the Y terminal of the comparator 19, only data signals D (7 . . . 1) are input to be compared with the seven bit output Q (6 . . . 0) of the exposure clock counter 18. In FIG. 5, the dashed line indicates the logic circuit dedicated for use with each respective LED channel, LED1 in this figure. In addition, as can be seen in FIG. 4, each LED channel has a dedicated respective comparator 19.

The LATCHZ pulse also sets the counter 18 into the down-counting mode and causes a flip-flop 18a associated with the counter 18 to output a count-enable signal on line 210 that is logic high. An AND logic gate 110 has an output line 212 which goes to a logic high level when the three inputs thereto are logic high levels. This is achieved during the count mode being enabled assuming there is a data signal of at least decimal 1 as established by logic gate 111. Logic gate 111 receives at its input the eight-bit image data signal for the pixel to be recorded by the respective LED and provides a logic high level signal at its output if the data signal for recording a pixel by this LED is at least decimal "1", otherwise no enablement of the LED is needed. When there is a match (X=Y) of the count input (terminal X) and image data input (terminal Y), the output line 209 goes to logic level high until the next exposure clock pulse. As the output of logic AND gate 110 goes to a logic high level, this output is connected to one input of a flip-flop 118 which responds to the change on line 212 and switches the output of the flip-flop 118 to logic level high on line 214. The output on line 214 is connected to the constant current driver 23 which has a transistor switch circuit that responds to the signal on line 214 to cause current to flow to the respective LED for a duration corresponding to the presence of a logic high signal on line 214. The least significant bit DO is inverted by inverter 112 and its output on line 213 is input to one input of AND gate 114. A second input to AND gate 114 is from an AND gate 116. One input to AND gate 116 is a signal from counter 18 indicating whether the counter is in an up or down counting mode. The AND gate 116 will be enabled to output a logic high signal when the 7-bit comparator has indicated a match is present (X=Y) at the comparator and the counter is in an up-counting mode. Recall that the counter count modes are down-counting followed by up-counting for the enablement cycle of turning on and turning off the current to an LED. However, this is not critical and the counter may count up initially and then down. If the counter 18 is in the up-counting mode and the comparator determines a match at its input (X=Y), the output of AND gate 116 will change to a logic high level on line 220. If the least significant bit DO is also a digital logic level "0" (low) then the output of AND gate 114 on line 222 will be a logic level high and will switch the output of flip-flop 118's output line 214 to logic level low thereby causing current to the LED to terminate. It may be seen that line 222 is one input to a logic OR gate 122 whose output line 234 when it transitions to logic level high causes the flip-flop 118 to switch.

In the event that DO (the least significant bit of the data signal) is a logic high or digital "1" (i.e., D(7 . . . 0) is a decimal odd number) then during the up-counting mode a match of the comparator inputs (X=Y) will not cause a flip-flop 118 to be switched off immediately. Instead, the match will cause a logic high signal on line 220 that at a next exposure clock pulse will cause the output line 230 of flip-flop 126 to switch to a logic high level. As can be seen in FIG. 5, line 220 is also an input line to the flip-flop 126. At this time, both inputs to logic AND gate 128; i.e., DO and line 230, are logic high levels and the output line 232 of logic AND gate 128 is a logic high level. The output line 232 is connected as one input to logic OR gate 122 whose output on line 234 thus becomes a logic high level. Line 234 is an input to the flip-flop 118 and during an exposure clock pulse, causes the output of flip-flop 118 to switch to digital logic level low or "0" and to switch a transistor in the current driver to cause current to the LED to terminate. Thus, when the least significant data bit DO is digital logic level 1 or a decimal odd number, the termination of the LED exposure is at the next succeeding exposure clock pulse following the detection of a match at the comparator inputs (X=Y condition).

Figure 6:
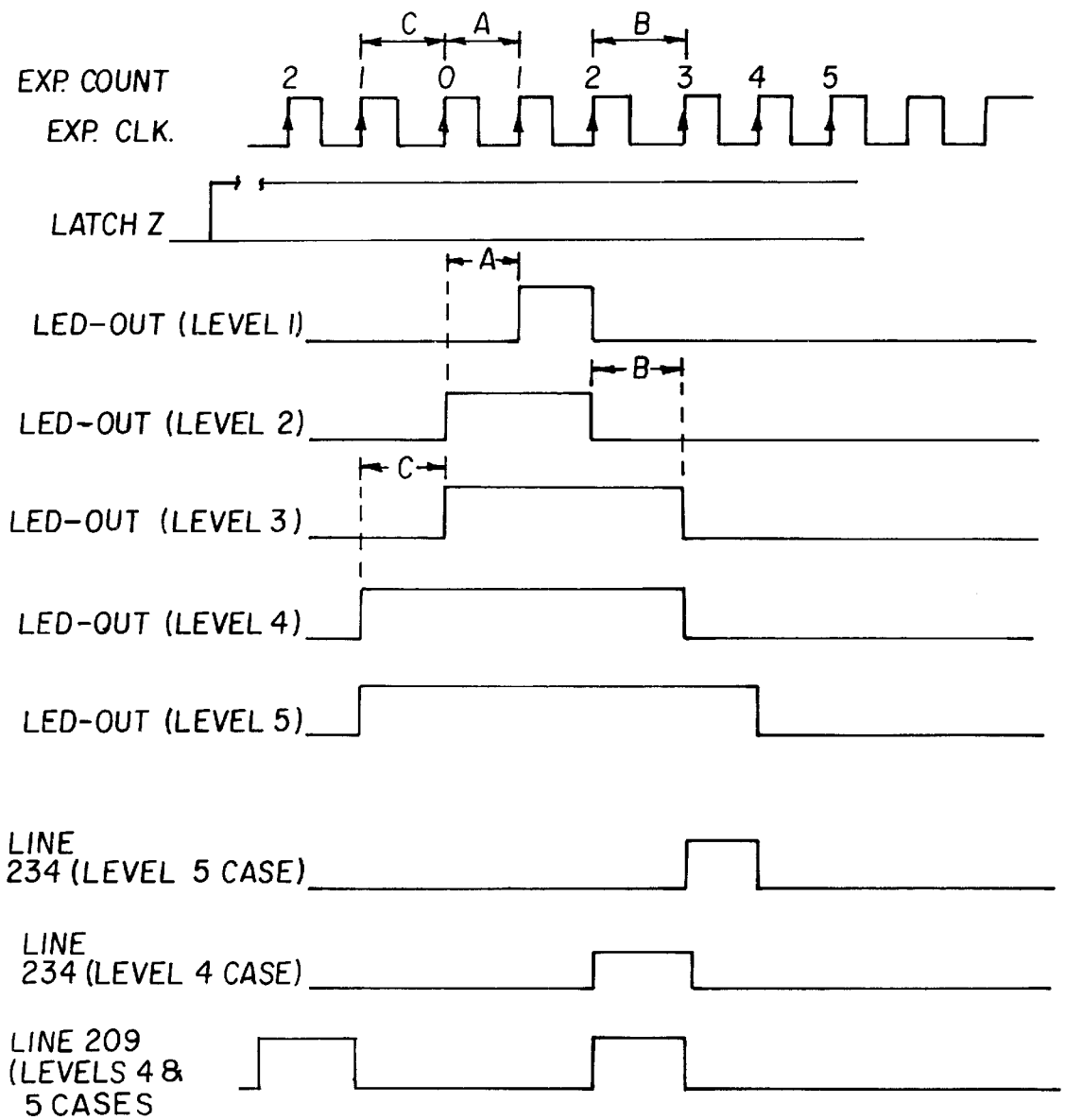
FIG. 6 is a timing diagram illustrating various signals in use of the circuit of FIG. 5.

In the timing diagram illustrated in FIG. 6, five LED enablement times are illustrated relative to exposure clock pulses. For an image data signal calling for a level 1 exposure (binary signal 00000001) DO is 1. As an odd number image data signal LED on time for recording a pixel with this image data signal is determined by commencing exposure with the detection of a match at the comparator's 18 inputs (X=Y) during the down-counting mode and terminating exposure at the detection of an exposure clock pulse after the detection of a match at the comparator's 18 inputs during the up-counting mode.

Considering an image data signal calling for a level 2 exposure (binary 00000010), this is an even number and exposure is determined by commencing exposure upon detection of a match at the inputs of comparator 18 during the down count and detecting a match at the inputs of the comparator 18 at the up count. As can be seen in FIG. 6, a level 2 exposure commences before a level 1 exposure by a time "A" based on the fact that they both commence at different respective match counts at the comparator in the down-counting mode 18. However, both level 1 and level 2 exposures terminate at the same time because a level 2 exposure terminates at its match count at the comparator inputs in the up-counting mode whereas level 1 exposure terminates at one exposure clock subsequent to a respective match count at the comparator inputs.

Consider now the level 3 and level 2 exposures. If one looks at the binary data bits D(7 . . . 1) defining these 5 exposure levels they are identical so that exposure commencement for these two levels is simultaneous. However, level 3 is an odd number; i.e., DO is a logic level high or digital 1) and thus a level 3 exposure terminates at one exposure clock pulse time period "B" after a level 2 exposure.

Considering exposure levels 3 and 4 their binary data bits D (7 . . . 1) are different so that the exposure for even-numbered exposure level 4 commence one exposure clock time period "C" before that of a level 3 exposure. However, since the level 3 exposure is an odd number, the respective exposures for level 3 and level 4 terminate at the same time. Compare this with exposure levels 1 and 2.

For level 4 and 5 exposures, the situation is similar to that described for levels 2 and 3 featuring identical exposure commencement times but the odd number level exposure terminates at one clock cycle (time period "D") after the lower level even-numbered exposure.

It will be understood that where the exposure clock pulses are uniformly spaced in time in the different counting modes that the time periods A, B, C and D will be identical. However, as noted above the use of non-linear spaced in time exposure clock pulses as described in U.S. Pat. No. 5,300,960 provides advantages in image recording and thus the exposure clock periods are not necessarily equally spaced in time.

Figure 1:
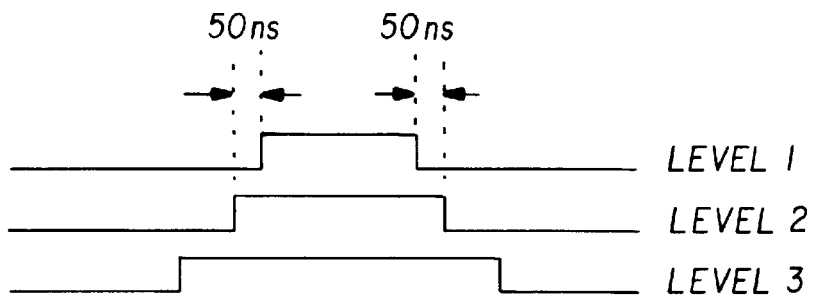
FIG. 1 is a diagram showing a series of center pulsewidth modulated waveforms as known in the prior art.

The diagrams of exposure times 6–255 are not illustrated but are readily determinable from the description of the circuit of FIG. 5 and the diagram of FIG. 6. Thus, an exposure at exposure level 6 will start one exposure clock period before exposure level 5 and terminate at the same time as an exposure at exposure level 5. An exposure at exposure level 7 will commence at the same time as an exposure at exposure level 6 and terminate at one exposure clock period after termination of an exposure clock period after termination of an exposure at exposure level 6. This relationship continues with increasing exposure levels so that each exposure level (except for exposure level 1) is only one exposure clock period longer than an immediately prior exposure level. Comparing this with a center pulsewidth modulated (CPWM) approach, one can see that distinct advantages are present. In the CPWM approach (FIG. 1), the closest difference in exposure time obtainable between two exposure levels is two exposure clock pulses due to the symmetric nature of the pulsing scheme in the CPWM approach. However, where hardware constraints limit the closeness in time in positioning of exposure clock pulses especially when printing at very high speed, this constraint can be undesirable in image rendition of pixels of different density. The approach described herein of alternating exposure level changes at the commencement of the exposure and at the termination of exposure preserves some of the benefits of center pulsewidth modulation such as location of centers of dots or pixels along common center lines which have an advantage in printing characters which are comprised of straight lines. There is also the preservation of the feature of not requiring all selected LEDs to turn on simultaneously.

Figure 7:
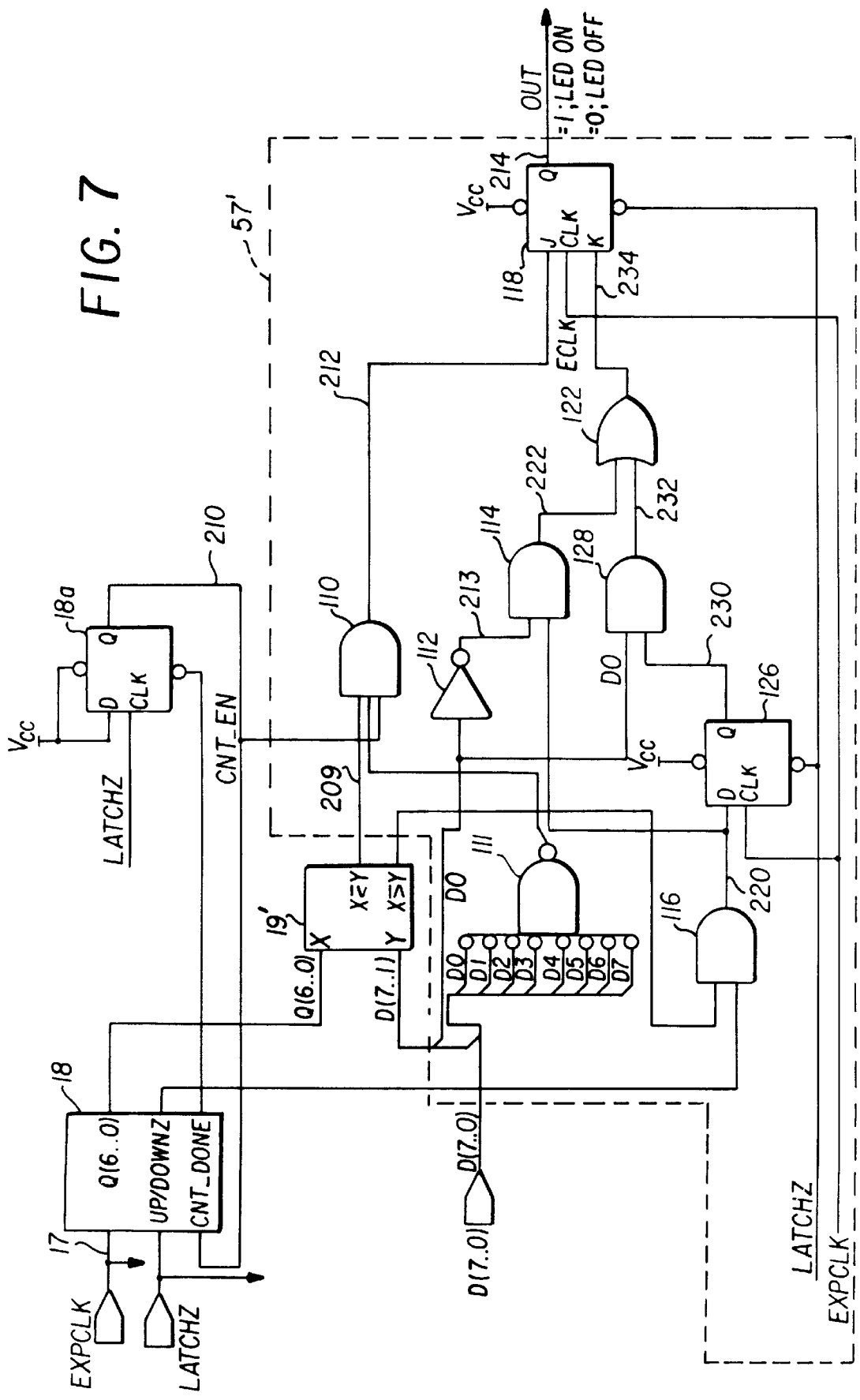
FIG. 7 is a schematic of a circuit that is an alternative embodiment to the circuit of FIG. 5 and also forms a part of the printer apparatus of the invention.

With reference to FIG. 7, there is illustrated an alternative circuit that is identical to that of FIG. 5 except that the comparator 19 is an inequality comparator rather than an equality comparator used in the embodiment of FIG. 5.

Inequality comparators are more preferable in environments where electrical noise is likely to degrade the integrity of the exposure clock signals and thus the counter may tend to increment a count in response to noise before the equal to comparator 19 has completed its comparison. In the embodiment of FIG. 7 the X< or =Y output of the comparator 19' is connected to the logic circuitry 57[1] is used for turning on driver current to the LED whereas the X> or =Y output of the comparator 19' is used for turning off driver current to the LED. The operation is otherwise identical to that described for the embodiment of FIG. 5.

While the embodiments of FIGS. 5 and 7 use additional logic gates compared to the CPWM approach the gate increase is fairly insignificant with implementation that employs the sub-micron CMOS process. Higher exposure clock rates are also possible because propagation delays of the seven bit counter and seven bit comparator are shorter than the eight-bit versions.

Figure 8B:
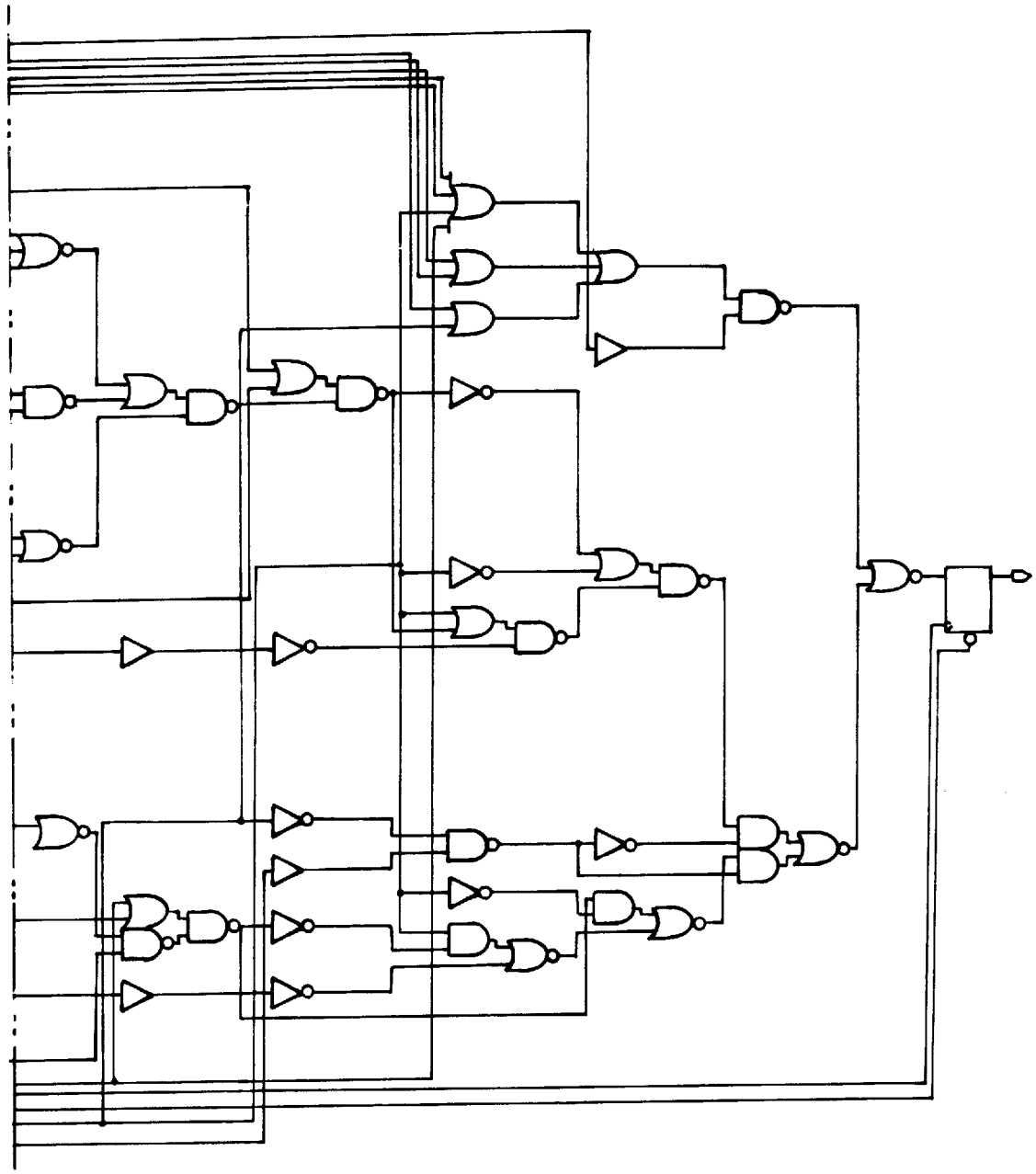
FIG. 8 is a schematic of a circuit that uses inequality comparators as in the circuit of FIG. 7 but eliminates certain J–K flip-flops and represents a computer generated circuit that can operate in accordance with the printer apparatus of the invention.

With reference to FIG. 8, there is illustrated a logic circuit representing another implementation of the apparatus of the invention. This logic circuit implementation provides combinations of logic elements that provide three comparator functions, two provide "less than or equal" type comparison functions and the third is the "less than" comparison function. This circuit provides the identical function as the one in FIG. 7 but is slightly slower but can be implemented in fewer gates. The logic circuit can be generated using VHDL code as provided in the attached appendix and which is run through a VHDL simulator and synthesized into circuitry which can perform the functions described herein.

Figure 9:
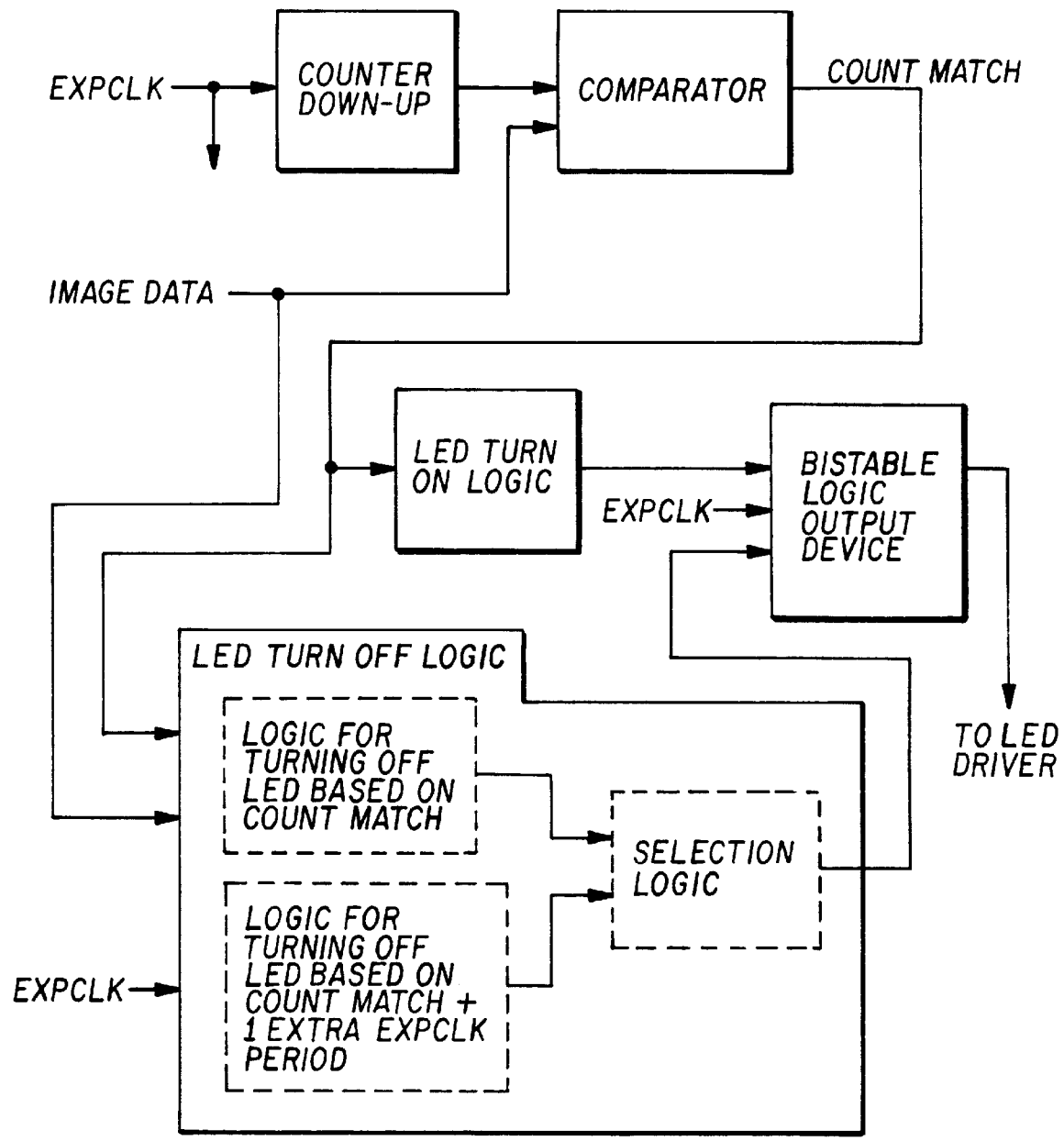
FIG. 9 is a schematic illustrating with general functional blocks a circuit that represents a part of the printer apparatus of the invention.

With reference to FIG. 9, the various embodiments generally feature an exposure clock counter, a comparator that compares image data for a pixel to be recorded with an exposure count, logic for synchronizing turn of current to the LED based on the status of the comparator, logic for turning off of the current to the LED based either on the comparator status or the comparator status plus one additional exposure clock pulse period. Note that by ignoring the least significant bit DO as a factor in the LED turn-on operation, the logic for turn-on is relatively simple. Other logic arrangements for accomplishing the broader teaching of this invention may be used. Thus, circuitry may be provided which includes using the least significant bit to determine control for turn-on rather than turn-off.

Figure 2:
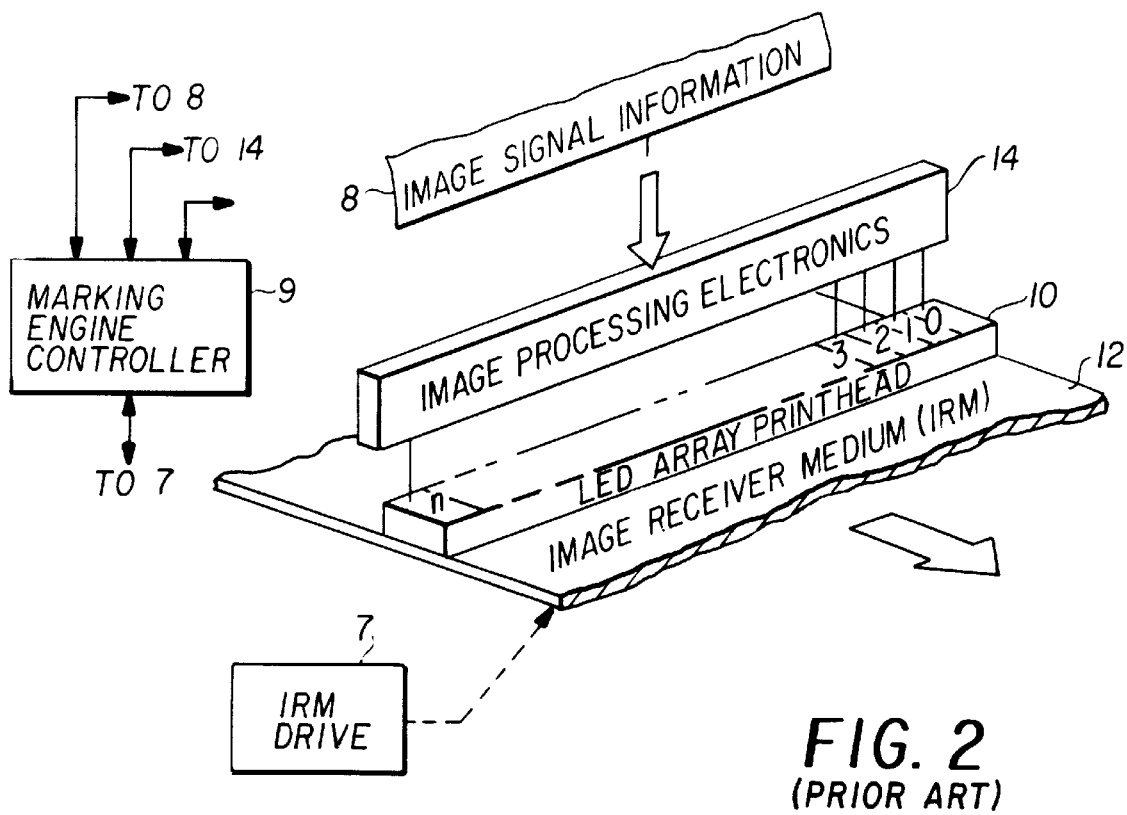
FIG. 2 is a schematic of a non-impact printer apparatus as known in the prior art and is generally configured in accordance with a preferred embodiment of a printer apparatus of the invention.

The invention also contemplates use of the printer apparatus of the invention for controlling enablement of groups of recording elements using strobe pulses as described in FIGS. 2 and 3 of Ayers et al.

The invention has been described with reference to LEDs, but the broader aspects of the invention are usable with other recording elements such as electrographic, thermal, laser, spatial light modulators, inkjet, etc.

The recording medium is preferably an electrophotoconductive recording medium used in an electrophotographic recording apparatus wherein a uniform electrostatic charge is deposited on the recording medium and the exposure from the LEDs imagewise modulates the charge to form an electrostatic image which is then developed with electroscopic pigmented toner particles and transferred to a receiver sheet.

The invention has been described in detail with particular reference to preferred embodiments thereof, but it will be understood that variations and modifications can be effected within the spirit and scope of the invention.

What is claimed is:

1. A non-impact printer apparatus comprising:

a plurality of recording elements;

a circuit that is associated with the recording elements to enable selected recording elements each for only a single respective predetermined time period during a pixel recording cycle for recording by the selected recording elements respective pixels during the pixel recording cycle, the pixel recording cycle being a period during which a row of pixels are to be recorded in a fast scan direction of recording by all of the selected recording elements, time periods during said cycle for some first recording elements of the selected recording elements beginning at the same time but ending at two different ending times and the time periods during said cycle for some second other recording elements of the selected recording elements starting after the beginning of the time periods of said first recording elements and ending at an earlier ending time of the two different ending times.

2. The apparatus of claim 1 wherein the circuit includes:

a counter that counts exposure clock pulses;

an input line connected to the counter upon which exposure clock pulses are input to the counter;

a comparator that compares data for recording a pixel with an output of the counter and provides an output relative to a comparison of the data and the output of the counter; and logic circuitry that is responsive to the output of the comparator to delay an ending time period for at least one exposure clock period.

3. The apparatus of claim 2 wherein a least significant bit of the data is not part of the data compared by the comparator and the comparator is responsive to the data for recording a pixel with the output of the counter to determine a time for commencement for recording a pixel by a recording element.

4. The apparatus of claim 1 wherein the recording elements are in a row and each enabled recording element is enabled for a single predetermined period during the pixel recording cycle.

5. A non-impact printer apparatus comprising:

a plurality of recording elements;

a circuit that is associated with the recording elements to enable selected recording elements each for only a single respective predetermined time period during a pixel recording cycle for recording by the selected recording elements respective pixels during the pixel recording cycle, the pixel recording cycle being a period during which a row of pixels are to be recorded in a fast scan direction of recording by all of the selected recording elements, time periods during said cycle for some first recording elements of the selected recording elements ending at the same time but stating at two different beginning times, and the time periods during said cycle for some second other recording elements of the selected recording elements staring after the two different beginning times of the time periods of said first recording elements and ending before the ending time of the first recording elements.

6. The apparatus of claim 5 wherein the circuit includes:

a counter that counts exposure clock pulses;

an input line connected to the counter upon which exposure clock pulses are input to the counter;

a comparator that compares data for recording a pixel with an output of the counter and provides an output relative to a comparison of the data and the output of the counter; and logic circuitry that is responsive to output of the comparator to delay an ending time period for at least one exposure clock period.

7. The apparatus of claim 6 wherein a least significant bit of the data is not part of the data compared by the comparator and the comparator is responsive to the data for recording a pixel with the output of the counter to determine a time for commencement for recording a pixel by a recording element.

8. The apparatus of claim 5 wherein the recording elements are in a row and each enabled recording element is enabled for a single predetermined period during the pixel recording cycle.

9. A non-impact printer apparatus comprising:

a plurality of recording elements;

a circuit for enabling the recording elements, the circuit including:

a counter having a count-down and count-up mode of counting, the counter having an input line to the counter having exposure clock pulses periodically carried on the input line for counting of the exposure clock pulses by the counter and the counter having a count output line for outputting a time changing count value;

a comparator associated with each of the recording elements and having one input line connected to the count output line and a second input representing image data for recording a pixel by the respective recording element;

turn-on logic circuitry responsive to an output of the comparator and synchronized with exposure clock pulses for enabling each recording element having the same more significant bits of image data to begin recording of a pixel at the same time; and turn-off logic circuitry for turning off recording elements, having different least significant bits of image data, at different times differing by one exposure clock pulse period, wherein more significant bits of image data represent information for use in determining a portion of an exposure time for recording a pixel that is longer than a portion of exposure time for which a least significant bit of information represents for recording the pixel.

10. A method of non-impact printing comprising:

enabling selected recording elements each for only a single respective predetermined time period during a pixel recording cycle for recording respective pixels during the pixel recording cycle, the pixel recording cycle being a period during which a row of pixels are to be recorded in a fast scan direction of recording by all of the selected recording elements, time periods during said cycle for some first recording elements of the selected recording elements being at the same time but ending at two different ending times and the time periods during said cycle for some second other recording elements of the selected recording elements sting after the beginning of the time periods of said first recording elements and ending at an earlier ending time of the two different ending times.

11. The method of claim 10 and including counting exposure clock pulses to generate count values; comparing data for recording a pixel with the count values and generating a signal indicating a match; in response to the signal controlling a beginning time for commencing recording of a pixel by a recording element by considering the more significant bits of the data and not the least significant bit of the data and controlling an ending time period for terminating recording by the recording element in accordance with the least significant bit.

12. The method of claim 10 and including generating exposure clock pulses;

counting exposure clock pulses to generate count values;

comparing data for recording a pixel with the count values and generating match signals indicating a match;

controlling a beginning time for commencing recording of a pixel by a recording element in response to one of the match signals and controlling an ending time in response to another of the match signals; and delaying a beginning or termination of commencement of recording by the recording element by at least one exposure clock period in accordance with a least significant bit of the data.

13. A method of non-impact printing comprising:

enabling selected recording elements each for only a single respective predetermined time period during a pixel recording cycle for recording by the selected recording elements respective pixels during the pixel recording cycle, the pixel recording cycle being a period during which a row of pixels are to be recorded in a fast scan direction of recording by all of the selected recording elements, time periods during said cycle for some first recording elements of the selected recording elements ending at the same time but starting at two different beginning times, and the time periods during said cycle for some second other recording elements of the selected recording elements starting after the two different beginning times of the time periods of said first recording elements and ending before an ending time of the first recording elements.

14. The method of claim 13 and including generating exposure clock pulses;

counting exposure clock pulses to generate count values;

comparing data for recording a pixel with the count values and generating match signals indicating a match;

controlling a beginning time for commencing recording of a pixel by a recording element in response to one of the match signals and controlling an ending time in response to another of the match signals; and delaying a beginning or termination of commencement of recording by the recording element by at least one exposure clock period in accordance with a least significant bit of the data.

* * * * *

UNITED STATES PATENT AND TRADEMARK OFFICE
CERTIFICATE OF CORRECTION

PATENT NO. : 6,061,078  
DATED : May 9, 2000  
INVENTOR(S) : Yee S. Ng et al.

Page 1 of 1

It is certified that error appears in the above-identified patent and that said Letters Patent is hereby corrected as shown below:

<u>Patent Reference</u>
Title Page, Section 75, delete "M." and substitute --- W.---.

<u>Application Reference</u>
Combined Declaration For Patent Application and Power of Attorney Column 11, line 55, delete "stating" and substitute --- starting ---.

Claim 5, line 10

Column 12, line 55, delete "being" and substitute --- beginning ---.

Claim 10, line 8

Column 12, line 58, delete "sting" and substitute --- starting --.

Claim 10, line 10

Signed and Sealed this

Seventh Day of August, 2001

*Attest:*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,061,078
DATED : May 9, 2000
INVENTOR(S) : Yee S. Ng et al.

It is certified that error appears in the above-identified patent and that said Letters Patent is hereby corrected as shown below:

Column 11, claim 5,
Line 58, delete "staring" and substitute -- starting --

Signed and Sealed this

Eleventh Day of December, 2001

Attest:

NICHOLAS P. GODICI
Attesting Officer   Acting Director of the United States Patent and Trademark Office